United States Patent [19]

Nanba et al.

[11] 4,103,865
[45] Aug. 1, 1978

[54] BALL VALVE

[75] Inventors: Kamori Nanba; Tomoyuki Ueda; Tetsunori Matsuda, all of Nobeoka, Japan

[73] Assignee: Asahi Yukizai Kogyo Kabushiki Kaisha, Nobeoka, Japan

[21] Appl. No.: 697,529

[22] Filed: Jun. 18, 1976

Related U.S. Application Data

[63] Continuation of Ser. No. 605,838, Aug. 19, 1975, abandoned.

[30] Foreign Application Priority Data

Aug. 24, 1974 [JP] Japan .................. 49-100790

[51] Int. Cl.² ............................................. F16K 5/06
[52] U.S. Cl. .................................. 251/148; 251/315
[58] Field of Search ............... 251/315, 148, 150, 151, 251/152

[56] References Cited

U.S. PATENT DOCUMENTS

| 2,995,336 | 8/1961 | Usab | 251/315 |
|---|---|---|---|
| 3,096,965 | 7/1963 | Margus et al. | 251/315 |
| 3,182,952 | 5/1965 | Montesi | 251/315 |
| 3,245,655 | 4/1966 | Oetjens | 251/315 |
| 3,550,902 | 12/1970 | Pidgeon et al. | 251/315 |
| 4,023,773 | 5/1977 | Wise | 251/315 |

FOREIGN PATENT DOCUMENTS

| 1,220,081 | 1/1960 | France. |
|---|---|---|
| 112,417 | 12/1965 | Italy. |
| 39-29,872 | 9/1964 | Japan. |
| 40-5,875 | 1965 | Japan. |
| 296,102 | 4/1954 | Switzerland. |

Primary Examiner—William R. Cline
Assistant Examiner—H. Jay Spiegel
Attorney, Agent, or Firm—Stevens, Davis, Miller & Mosher

[57] ABSTRACT

In a ball valve made of a plastic material and having, as the principal components thereof, a valve body 1, a ball 2, carriers 3 contacting with said ball and connecting with body caps 4, a valve seat 6, a stem 8 and a handle 7 attached to said stem, an improvement is disclosed which comprises providing the carrier 3 disposed on each side of said ball with a flange 13 and interposing an elastic seat gasket 12 between the valve body 1 and the flange 13 of each carrier 3.

1 Claim, 3 Drawing Figures

BALL VALVE

This is a continuation of application Ser. No. 605,838 filed Aug. 19, 1975 now abandoned.

BACKGROUND OF THE INVENTION

This invention relates to improvements in and concerning a plastic ball valve.

Concerning improvements in a plastic ball valve, the applicant of the present patent application formerly applied for a utility model registration on a construction of the plastic ball valve comprising a ball possessed of a trapezoidal groove, a stem possessed of a trapezoidal protuberance conforming to said trapezoidal groove, a handle fitted with an elastic metal piece coupled with a notch formed in said stem, and carriers contacted with said ball and connected via intervening O rings with body caps as illustrated in FIG. 3.

The ball valve of the prior invention covered by Japanese Utility Model Application No. 69896/1972 has a construction such that the positions of the carriers cannot be fixed at the stage of assembly. It is, therefore, not very easy for the ball valve to be assembled by having the ball kept at the center. In this construction, the stress due to the thermal expansion of the pipe is exerted directly upon the ball via the carriers, with the result that the handle torque is increased and the wear of the seat is accelerated to degade the sealing property of the valve. If the center of the pipe and the axis of the flow path in the valve fall to coincide with each other and yet the pipe is forcibly connected to the valve body, then the pipe is slanted with respect to the union bodies. Consequently, the force with which the carriers are held in contact with the ball is partially increased, the magnitude of the handle torque is increased and the contact between the valve body and the carriers via the intervening O rings becomes deficient to the extent of suffering leakage through the cap nuts while the handle is completely opened. This forms an inevitable defect of this ball valve.

SUMMARY OF THE INVENTION

It is an object of the present invention to provide a functionally excellent ball valve easy of assembly and free from possible leakage through the valve in its completely closed state. This object is accomplished by attaching a flange 13 to each of the carriers 3 which are contacted with the ball 2 and connected with the body caps via the 0 rings 9.

DETAILED DESCRIPTION OF THE INVENTION

Figure 1:
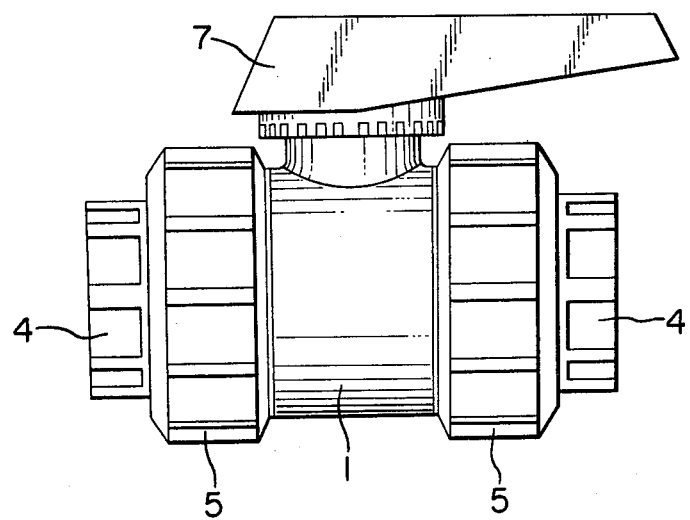
FIG. 1 is a front view of the ball valve according to the present invention.
Figure 2:
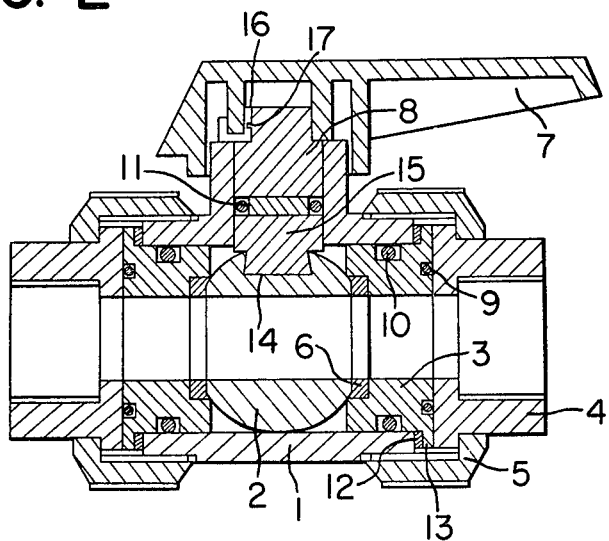
FIG. 2 is a longitudinally sectioned front view of said ball valve.
Figure 3:
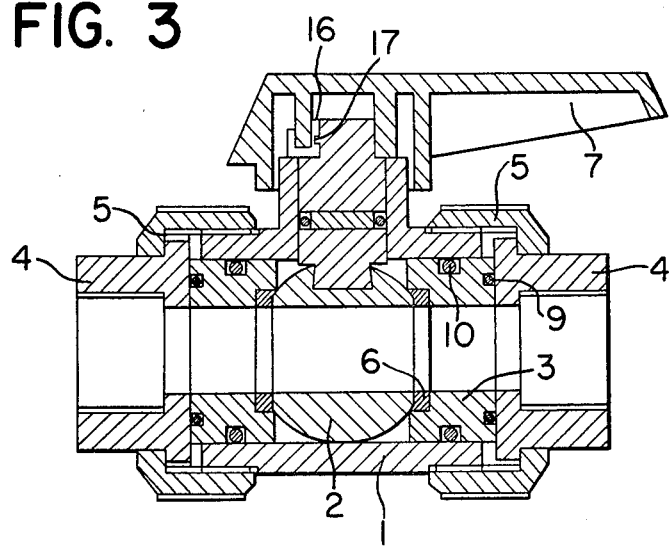
FIG. 3 is a longitudinally sectioned front view of the conventional ball valve.

The present invention concerns a double-ended tall valve as illustrated in FIG. 1. FIG. 2 is a longitudinally sectional front view representing the construction of said ball valve; 1 denotes a valve body, 2 a ball provided with a trapezoidal groove 14 in the upper side thereof, 3 a carrier provided with a flange 13 and disposed to contact with the ball 2 and connect with a body cap 4 via an intervening O ring 9, 5 a cap nut, 6 a valve seat, 7 a knob fitted with an elastic metal piece 16 coupled with a notch 17 formed on a stem, 8 a stem possessed of a trapezoidal protuberance 15 conforming to the trapezoidal groove 14 formed in the ball 2, 9 an O ring serving to seal the opening between the carrier 3 and the body cap 4, 10 another O ring serving to seal the opening between the valve body 1 and the carrier 3, 11 still another O ring serving to seal the opening between the valve body 1 and the stem 8, 12 an elastic seat gasket inserted between the valve body 1 and the carrier 3, and 13 a flange formed on the carrier 3 on the body cap side thereof.

Because in the ball valve according to the present invention, the trapezoidal protuberance 15 formed on the stem 8 is coupled with the trapezoidal groove 14 formed in the ball 2, said ball 2 can be moved in the direction of the major axis of said protuberance 15 perpendicularly with respect to the said stem 8. The stem 8 is thus coupled with the ball 2 and, because of this coupling, can be prevented from being drawn out of the valve body 1. Said stem 8 is provided with the O ring 11 which serves to prevent leakage to the fluid. The 3 possessed of the flange 13 so as to keep in contact with said ball 2 is connected via the O ring 9 with the body cap 4.

Since the present invention has two carriers 3 each provided with a flange 13, which are disposed on either side of the ball 2, the cap nuts 5 driven into the valve body from the opposed sides thereof enable the carriers 3 to be connected via the O rings 9 to the body caps 4 and at the same time fixed in position via the seat packings 12 onto the valve body 1. The openings between the valve body 1 and the carriers 3 are sealed by the O rings 10. In this case, it is extremely easy to have the entire valve assembled with the ball 2 positioned at the center of the valve body 1 because the carriers 3 are fixed in position symmetrically with each other with respect to the center of the ball 2. Moreover, the stress originating in the thermal expansion of the pipe is dispersed through the flanges 13 of the carriers 3 and the seat packings 12 to the valve body 1, with the result that the magnitude of the stress exerted upon the ball 2 is decreased and the otherwise possible increase of handle torque is lowered. If the center of the pipe deviates from the axis of the flow path in the valve and the pipe is forcibly attached to the valve body, the flanges 13 of the carriers preclude the possibility of the carriers 3 being fixed in their inclined state onto the valve body 1, making it possible to curb the increase of handle torque. If the pipe is inclined somehow or other and the effect of the O ring 10 is degraded, the seat packings 12 serve the purpose of preventing leakage through the cap nuts while the valve is completely opened.

Said O rings 9 serve to provide perfect connection between the carriers 3 and the body caps 4 and also function to adjust the pressure of contact between the carriers 3 and the ball 2. For the purpose of cleaning the valve interior, the principal components of the ball valve such as the ball 2 connected to the stem 8, the carriers 3 and the body caps 4 can be removed out of the valve body 1 merely by removing the body caps, pulling out the carriers disposed on either side of the ball, disengaging the ball 2 from the trapezoidal protuberance of the stem 8, separating the handle from the stem 8 and pulling out the stem 8. The present invention, therefore, is not required to incorporate in the valve any extra flange, carrier coupling, etc. exclusive for the purpose of cleaning the valve interior and permits ready piping. Further, the inspection of the ball valve and the replacement of worn parts and so forth can be accomplished with extreme ease.

In the case of the single-ended valve, the piping must be carried out with particular attention for the direction of the flow of fluid is fixed. When the valve seat is worn to the extent of entailing possibility of involving leakage of fluid after a prolonged service, possible leakage is prevented by tightening the seat. In the case of the single-ended valve, such tightening results in a deviation of the center of the ball and a consequent increase in the handle torque. In the double-ended valve like the one contemplated by the present invention, said tightening can be given from the both sides so as to keep the ball directly below the center of the handle at all times. This is highly advantageous because the handle torque remains constant without any increase.

As the plastic materials for making the ball valve of the present invention, there may be used any thermosetting resins such as, for example, polyvinyl chloride resins, polypropylene resins, polyethylene resins, phenol resins, urea resins, epoxy resins, and polyester resins. Selection of particular types of such thermosetting resins depends on the purpose for which the ball valve is used and the function and object of individual component parts composing the ball valve. For example, the components such as the valve body, ball, body caps, carriers and stem which are exposed to contact with the fluid in motion are made of a polyvinyl chloride resin which excels in mechanical properties and chemical resistance; the valve seat is made of a polytetrafluoroethylene resin which combines lubricating property and wear resistance with chemical resistance and heat resistance; and the handles, cap nuts and the like are made chiefly of an ABS resin or polyvinyl chloride resin which has outstanding mechanical strength.

As the elastic material for the seat gasket, a rubbery material, an asbestos-based material or some other synthetic resin may be used.

As described above, the ball valve according to the present invention retains the advantageous points of the ball valve of the prior application and eliminates the disadvantage by having the carriers provided with a flange. Thus, it enjoys an outstanding function, permitting easy assembly and precluding leakage through the valve in its completely closed stage.

What is claimed is:
1. A ball valve comprising:
   a valve body having a substantially cylindrical internal wall, a substantially cylindrical external wall, and substantially flat radially extending end faces;
   a valve ball within said valve body, said ball being rotatable for controlling fluid flow therethrough and having a trapezoidal groove defined therein;
   a carrier on each side of said ball, each of said carriers comprising:
      a substantially cylindrical section having a diameter substantially equal to that of the internal wall of the valve body and extending into said valve body, said section having a first substantially circular recess defined in the outer periphery thereof;
      a substantially straight radially outwardly extending flange of an outer diameter greater than that of the internal wall of the valve body but less than that of the external wall of the valve body; and
      a substantially flat radially extending end face defined in part by said flange, said end face having a second substantially circular recess defined therein;
   a seat packing in direct contact with and positioned between the ball and each of said carriers;
   two body caps, each of said caps comprising:
      a substantially cylindrical section;
      a substantially radially outwardly extending flange of an outer diameter substantially equal to that of the flanges of the carriers; and
      a substantially flat radially extending end face, defined in part by the flange of the body cap, which abuts flush with a respective one of the flat end faces of the carriers;
   a first O-ring in each of said first recesses for sealing any space between said carriers and the internal wall of said valve body;
   a second O-ring in each of said second recesses for sealing any space between the end faces of said carriers and the corresponding end faces of said body caps;
   an annular elastic seat gasket, sandwiched between the flange of each of said carriers and a respective one of the end faces of the valve body, for absorbing stress caused by thermal expansion which would otherwise be transmitted from the carriers to the ball;
   two cap nuts, each of said nuts having a substantially cylindrical section threadingly engagable with a respective end of the valve body and a radially inwardly extending flange which abuts a respective one of the flanges of the carriers;
   a stem having a trapezoidal protuberance positioned in said trapezoidal groove; and
   a handle engaged with said stem for rotating the ball via said stem whereby the valve ball can be easily changed by removing the cap nuts from the valve body, withdrawing the carriers from the valve body, disengaging the valve ball from the trapezoidal protuberance on the stem and removing the ball from the valve body.

* * * * *